United States Patent [19]

Phillips

[11] 4,288,338

[45] Sep. 8, 1981

[54] STATIC SOLAR HEAT STORAGE COMPOSITION

[76] Inventor: Hugh J. Phillips, 2510 N. 156th St., Omaha, Nebr. 68116

[21] Appl. No.: 131,067

[22] Filed: Mar. 17, 1980

Related U.S. Application Data

[63] Continuation-in-part of Ser. No. 39,312, May 16, 1979, abandoned.

[51] Int. Cl.³ .............................................. C09K 3/00
[52] U.S. Cl. ..................... 252/70; 106/110; 106/286.6; 106/286.7; 165/DIG. 4
[58] Field of Search ................ 106/110, 286.6, 286.7; 252/70; 165/104 S, DIG. 4

[56] References Cited

U.S. PATENT DOCUMENTS

| | | | |
|---|---|---|---|
| 2,677,664 | 5/1954 | Telkes | 252/70 |
| 2,706,716 | 4/1955 | Howe et al. | 252/70 |
| 2,808,494 | 10/1957 | Telkes | 219/19 |
| 2,827,438 | 3/1958 | Broadley et al. | 252/70 |
| 3,986,969 | 10/1976 | Telkes | 252/70 |
| 4,091,863 | 5/1978 | Schroder | 165/1 |

*Primary Examiner*—Lorenzo B. Hayes
*Attorney, Agent, or Firm*—Fitch, Even, Tabin, Flannery & Welsh

[57] ABSTRACT

A composition for the storage of heat energy utilizing the heat of fusion of the composition. The composition includes a salt-hydrate, a nucleating agent and a porous solid. The porous solid is selected from calcium sulfate hemihydrate and soluble calcium sulfate anhydride.

10 Claims, No Drawings

STATIC SOLAR HEAT STORAGE COMPOSITION

BACKGROUND OF THE INVENTION

This application is a continuation-in-part application of application Ser. No. 39,312, filed May 16, 1979, now abandoned.

The present invention relates generally to a mixture for the storage of heat energy utilizing primarily the heat of fusion of the mixture and also the sensible heat. More particularly, the present invention relates to a heat of fusion mixture for storage of solar generated heat which does not stratify after repeated heating and cooling cycles.

The economic utilization of solar generated heat energy requires a heat sink to store excess heat and to make that heat available for use at night and on cloudy days. A complete solar heating assembly usually includes a system to collect the heat from the sun, a system to store the heat until required for use, a system to conduct the heat either directly from the collection system or from the storage system to the required point of utilization and a system to control the proper allocation of heat collected between the required point of utilization and the storage system.

The technology of heat collection systems, conduction systems and control systems is well advanced in comparison with the development of adequate heat storage systems. The first heat storage systems utilized in connection with solar heat were monolithic masses of a material such as water or rock, where the storage capacity of the system is related to the mass and the specific heat of material and the temperature differential between the material and the area to be heated. Such storage systems (referred to herein as "specific heat" storage systems) require an enormous mass of material to store sufficient heat for even the smallest applications, such as residential home heating. While it is feasible to integrate a specific heat storage system into the original construction of a building, it is usually not economical. It is usually very difficult, if not impossible, to add a specific heat storage system to existing construction.

In recent years, heat storage systems which rely upon the heat of fusion of a compound when cycled between a solid, usually crystalline, state and a molten state have been gaining increasing favor. Such heat storage systems are referred to herein as "heat of fusion storage systems." Heat of fusion storage systems rely upon the heat which is released when a liquid is cooled and passes from a liquid state to a solid state. The heat of fusion is released within a narrow temperature range which is specific for each material and which is far greater than the specific heat for a given weight of the material.

Heat of fusion materials should have low cost, be available in large quantities, be non-toxic and non-flammable and desirably be non-corrosive. Most heat of fusion materials are in the form of salt-hydrates and their eutectics. Among the low cost, salt-hydrates having high heat of fusion are included: calcium chloride hexahydrate, sodium carbonate decahydrate, disodium phosphate dodecahydrate, calcium nitrate tetrahydrate, sodium sulfate decahydrate and sodium thiosulfate pentahydrate. A preferred heat of fusion material for many applications and one which has been extensively investigated is sodium sulfate decahydrate.

In use, the heat of fusion material is usually placed in a sealed system and is subjected in the system to successive heating and cooling cycles above and below the melting point of the heat of fusion material selected so as to use the heat of fusion properties of the material as it cools.

Several problems have been encountered in the use of heat of fusion materials in a solar energy heating system. For example, a nucleating agent is desirable to provide for the necessary seeding to initiate the formation of crystals and to thereby avoid supercooling which can occur in quiescent liquid solutions. Crystallization is necessary to make use of the heat of fusion of the material. With supercooling, the material does not crystalize and the solution acts as a specific heat storage system. U.S. Pat. No. 2,677,664 to Telkes describes the use of borax (sodium tetraborate decahydrate) in a heat of fusion system using sodium sulfate decahydrate ($Na_2SO_4 \cdot 10H_2O$).

Another problem encountered in utilizing heat of fusion materials has been that during melting some of the heat of fusion material remains undissolved in the water of crystallization which is released during the melting. This has been a particular problem with sodium sulfate decahydrate heat of fusion systems. The problem of stratification and various aspects of the invention are sometimes discussed hereinbelow with specific reference to sodium sulfate decahydrate. It should be understood, however, that the problem of stratification and the solution of the invention are equally suitable for other known salt-hydrate materials used in heat of fusion storage systems.

Due to its higher density, sodium sulfate sinks in the saturated solution during melting. When the mixture again solidifies, dissolved sodium sulfate combines with water of crystallization, but crystals of sodium sulfate near the bottom have insufficient water to recombine and provide the full sodium sulfate decahydrate molecule. Some crystals of sodium sulfate on or near the bottom of the container recombine with water molecules in their immediate vicinity to form a solid layer of sodium sulfate decahydrate crystals. The solid layer prevents further recombination of the sodium sulfate below this layer with the balance of the water of crystallization. In effect, three distinct layers are formed, a bottom layer of anhydrous sodium sulfate crystals, an intermediate layer of sodium sulfate decahydrate crystals and, on top, a layer of liquid saturated solution.

The heat of fusion which can be released from sodium sulfate decahydrate crystals is 108 BTU's per pound. The heat of fusion could be released over and over again if the salt can be homogenized during solidification by stirring or by other suitable means. Systems have been proposed wherein a container of this salt is shaken or stirred during the repetitive cycles of melting and solidifying the crystals of sodium sulfate decahydrate. It is, of course, not always convenient, or for that matter possible, to shake or stir the solution of sodium sulfate during the recurring cycles.

Other means for insuring homogeneity during the melting/crystallization cycle for salt-hydrate heat of fusion systems have included the use of various thickening agents which have been included as additives with the aim of producing a gel or thickened mass when the salthydrate is melted during the heat collection cycle. Thickening agents which have been tried include wood shavings, wood pulp, saw dust, fiber glass, various types of cellulosic mixtures, carboxymethyl cellulose, starch, silicon dioxide, soap, polyvinyl alcohol and alginates.

Silica gel, diatomaceous earth, volcanic clay and other finely divided silica products have also been used. U.S. Pat. No. 3,986,969 to Telkes describes the use of an attapulgite-type clay substance for use as a thixotropic agent to encapsulate the crystals of the salt-hydrate and prevent them from dropping to the bottom of the container during melting-crystallization cycles.

Many of the materials used to stabilize the salt-hydrate mixtures have performed well but only for a limited number of cycles. Organic materials become hydrolyzed or decomposed by bacterial or enzymatic action. Bactericides can slow the decomposition of organic materials but eventually the salt-hydrate mixture must be recharged. Silica gel and clay materials were found to impede the filling of the salt-hydrate mixture into containers because of their thickening properties.

Accordingly, it is a principal object of the present invention to provide an improved heat of fusion mixture for use in solar energy heating.

Another object of the present invention is to provide an improved heat of fusion mixture in which water released from the salt-hydrate has a reduced tendency to separate from the salt during crystallization and melting cycles.

A further object is to prevent stratification of salt-hydrate heat of fusion heat storage systems during repeated heating and cooling cycles.

A still further object of the present invention is to provide an improved method for operating a heat storage system in a solar heating assembly so as to obviate the problems caused by separation of water and the salt-hydrate during repeated crystallization and melting cycles.

BRIEF DESCRIPTION OF THE INVENTION

The present invention is directed to a heat of fusion heat storage system which is intended primarily for storage of solar generated heat wherein the heat of fusion mixture does not stratify after repeated heating and cooling cycles. In accordance with a preferred embodiment of the present invention a mixture for this storage of heat energy utilizing the heat of fusion of a salt-hydrate comprises the salt-hydrate, a nucleating agent and a porous solid for entrapment of anhydrous sodium sulfate and water of crystallization released during the heating cycle wherein the salt-hydrate is melted. The preferred porous solid is selected from calcium sulfate hemihydrate, soluble calcium sulfate anhydride and mixtures thereof.

A preferred method of preparing a mixture for the storage of heat energy in accordance with the invention includes the steps of preparing a dry mixture of an anhydrous salt, such as sodium sulfate, a nucleating agent, such as borax, and the porous solid. Thereafter, water is added to the dry mixture. The water is added at a level sufficient to provide a stable salt-hydrate form of the anhydrous salt and to further provide sufficient water for any calcium sulfate anhydride present to provide the stable calcium sulfate hemihydrate. The mixture of dry materials and water is then agitated until the mixture solidifies.

DETAILED DESCRIPTION OF THE INVENTION

The porous solid of the present invention acts as a receptor for the water of crystallization which is released by the salt-hydrate during the melting cycle. The porous solid retains water in close proximity to the salt and prevents stratification from occurring by formation of streated layers during successive melting and crystallization cycles. Salt-hydrates that may be used in the mixtures of the present invention for storage of thermal energy preferably have a heat of fusion greater than about 50 BTU per pound. Suitable salt-hydrates which have a heat of fusion greater than about 50 BTU per pound include sodium sulfate decahydrate, sodium thiosulfate pentahydrate, sodium carbonate decahydrate, disodium phosphate dodecahydrate, calcium chloride hexahydrate and calcium nitrate tetrahydrate.

The nucleating agent, of known type, is included to prevent the solution from supercooling during the crystallization cycle. Preferably, the nucleating agent is borax (sodium tetraborate decahydrate). The nucleating agent is used at a level of from about 4 to about 20 percent by weight of the salt portion of the salt hydrate. If borax is used as the nucleating agent, it is to be used at a level of from about 5 to about 10 percent by weight of the salt portion of said salt hydrate.

In accordance with the present invention, a porous solid is used to prevent stratification of the salt-hydrate during successive melting and crystallization cycles. A preferred porous solid in accordance with the invention is calcium sulfate hemihydrate (commonly referred to as plaster of paris) or soluble calcium sulfate anhydride.

When any of the forms of calcium dihydrate are heated, the water of crystallization is released in two stages to form first the hemihydrate, $CaSO_4 \cdot \frac{1}{2}H_2O$, and finally the anhydrous salt, $CaSO_4$. As a mass of calcium dihydrate, usually in the form of gypsum, is heated to within the range of 120°–130° C., water is released at a constant temperature. The heat consumed during this period is used to bring about the dehydration of the gypsum to the form of the hemihydrate. If heating is continued beyond the constant temperature period, additional water is liberated and calcium sulfate anhydride is formed. Usually, during the heating of the gypsum to prepare the hemihydrate, the heating is not stopped at the exact point where all of the water is driven off to form the hemihydrate and some calcium sulfate anhydride is formed. In accordance with the present invention, calcium sulfate hemihydrate and soluble calcium sulfate anhydride or mixtures thereof are used as the porous solid. If heating of soluble calcium sulfate anhydride is continued to temperatures above 1200° F., an insoluble anhydride form of calcium sulfate is formed. The insoluble calcium sulfate anhydride is not suitable for use in accordance with the present invention.

The porous solid is used at a level of from about 15 to about 75 percent by weight of the salt portion of the salt-hydrate. At this level of use a substantially solid structure is imparted to the heat of fusion mixture for storage of heat energy of the invention. The mixture appears to retain a solid structure during the melting phase of the complete heating and cooling cycle. While not wishing to be bound by any theory, it is believed that the retention of a solid appearing form during the heating-cooling cycle indicates that the water of crystallization of the salt-hydrate is retained within pores of the porous solid and is further retained in close proximity to the salt to assist in reformation of the salt-hydrate during the crystallization cycle.

In the preparation of the heat of fusion mixture of the present invention, it is preferred to dry blend the salt portion of the salt-hydrate with the nucleating agent and the porous solid. Thereafter, sufficient water to form the hydrate of the salt used in the mixture is added to the mixture. A sufficient amount of water is also added to complete formation of the calcium hemihydrate if the initial portion of the porous solid includes any calcium sulfate anhydride. The water is preferably heated to a temperature of from about 40° C. to about 90° C. prior to addition.

An alternate method for forming the heat of fusion storage mixtures of the present invention is to combine the salt-hydrate or anhydride, the nucleating agent and water. The mixture is heat cycled and, while the salt-hydrate or anhydride is melted, the mixture is filled into a container. A porous solid, which is preferably calcium sulfate hemihydrate, is then added in dry form. The mixture is then agitated until a substantially solid appearing mass is formed. Thereafter, the mixture is cooled and charged into a reservoir for use as a heat of fusion storage system. The mixture may be comminuted after cooling for ease of handling.

By way of example, the preferred salt-hydrate is sodium sulfate decahydrate. The preferred nucleating agent is borax and the preferred porous solid is calcium sulfate hemihydrate. For the preferred heat of fusion mixture, the sodium sulfate decahydrate is present at a level of from about 71 to about 84 percent by weight, the borax is present at a level of from about 1 to about 4 percent by weight and the calcium sulfate hemihydrate is present at a level of from about 14 to about 24 percent by weight.

EXAMPLE I

The following example further illustrates various features of the present invention but is intended to in no way limit the scope of the invention which is defined in the appended claims.

60.5 grams of sodium sulfate were introduced into a 125 ml flat glass bottle. 5.5 grams of borax and 35.0 grams of calcium sulfate hemihydrate were then added to the bottle. The dry mixture was blended thoroughly and 86.6 ml of water at a temperature of 50° C. was then added. The bottle was sealed with a stopper and a thermometer was inserted through the stopper. The bottle was then rotated along its long axis until the mixture solidified.

The bottle containing the above-described mixture was cycled daily for a month by heating to 40° C. in a heated water bath. Thereafter it was allowed to return to room temperature. A second bottle containing the same amounts of sodium sulfate, borax and water was treated similarly but was heated in a rocking heated water bath to break up any stratification of sodium sulfate which might occur. A third bottle containing only water was treated similarly. Once a week temperatures were recorded every ten minutes for each bottle until the temperature reached room temperature. There was no stratification or change in appearance of the bottle containing the calcium sulfate hemihydrate. This bottle also indicated a clear latent heat of fusion effect as it cooled.

The ideal situation for a solar heat storage system is a slow release of heat from storage for an extended time. Accordingly, the heat released by each bottle was recorded as a change of temperature per gram of material per minute ($\Delta t°$/gram/minute). A low value indicates a slow, uniform release of heat for an extended period of time. The following values were observed for the three systems described hereinabove:

| Bottle No. | Material | $\Delta t°$/grams/minute |
|---|---|---|
| 1 | $Na_2SO_4$:Borax: $CaSO_4 . \frac{1}{2}H_2O$ | .00020 |
| 2 | $Na_2SO_4$:Borax | .00021 |
| 3 | Water | .00170 |

EXAMPLE II

Three trays were constructed of $\frac{1}{8}$ inch Plexiglas. The trays were 1 inch thick and 12 inch square and had a volume of 1700 ml. One end was left open for filling. The first (tray #1) was filled with water, the second (tray #2) with 972.8 gms sodium sulfate anhydride, 88.4 gms borax and 1238.1 gms water. The open end of each tray was sealed with Plexiglas and acrylic cement.

The third (tray #3) was filled as described in Example I with 907.5 gms sodium sulfate anhydrous, 82.5 gms borax, 525 gms calcium sulfate hemihydrate and 1299 ml water. The tray was sealed and rotated until the contents solidified.

Thermocouples from a recorder were inserted in each tray and the tray was placed in a constant oven at 120° F. After a day each tray had reached a temperature of 120° F. The oven was turned off and the temperature was allowed to drop to ambient temperature, which for tray #2 and tray #3 took about thirteen hours. The following table indicates the release of energy of the 18th temperature cycle for tray #2 and tray #3.

| | | Initial Temperature | Final Temperature | BTU/ft$^2$ |
|---|---|---|---|---|
| Tray #2 | $Na_2SO_4$ $Na_2B_4O_7$ | 120° F. | 77° F. | 5280 |
| Tray #3 | $Na_2SO_4$ $Na_2B_4O_7$ $CaSO_4 . \frac{1}{2}H_2O$ | 120° F. | 82° F. | 6560 |

Thus tray #3 stored more heat. After 36 cycles, tray #3 had not stratified.

There has thus been described the use of a porous solid, preferably calcium sulfate hemihydrate, as an anti-stratification agent with salt-hydrates for use as heat of fusion materials for the storage of solar energy. Unique methods of forming such mixtures have also been disclosed.

It should be understood that many modifications may be made to the inventive concept of the present invention and many specific modifications may be made in the embodiment hereinabove described in the examples. Accordingly, it should be understood that it is intended that various modifications which might readily suggest themselves to those skilled in the art be covered by the following claims.

What is claimed is:

1. A composition for the storage of heat energy utilizing the heat of fusion of the composition, said composition comprising a salt-hydrate having a heat of fusion of more than about 50 BTU per pound, a nucleating agent and a porous solid selected from the group consisting of calcium sulfate hemihydrate and soluble calcium sulfate anhydride at a level from about 15 to about 75 percent by weight based on the weight of the salt portion of said salt-hydrate.

2. A composition in accordance with claim 1 wherein said salt-hydrate is selected from the group consisting of sodium sulfate decahydrate, sodium thiosulfate pentahydrate, sodium carbonate decahydrate, disodium phosphate dodecahydrate, calcium chloride hexahydrate and calcium nitrate tetrahydrate.

3. A composition in accordance with claim 1 wherein said nucleating agent is present at a level of from about 4 to about 20 percent by weight based on the salt portion of said salt-hydrate.

4. A composition in accordance with claim 1 wherein said nucleating agent is borax.

5. A composition in accordance with claim 4 wherein said borax is present at a level of from about 5 to about 10 percent by weight based on the weight of the salt portion of said salt hydrate.

6. A method of preparing a composition for the storage of heat energy comprising the steps of forming a blend of a salt hydrate, a porous solid selected from the group consisting of calcium sulfate hemihydrate and soluble calcium sulfate anhydride at a level of from about 15 to about 75 percent by weight based on the weight of the salt portion of said salt-hydrate, and a nucleating agent, mixing water with said blend and agitating said blend until said blend solidifies.

7. A method in accordance with claim 6 wherein said salt-hydrate is selected from the group consisting of sodium sulfate decahydrate, sodium thiosulfate pentahydrate, sodium carbonate decahydrate, disodium phosphate dodecahydrate, calcium chloride hexahydrate and calcium nitrate tetrahydrate.

8. A method in accordance with claim 6 wherein said nucleating agent is present at a level of from about 4 to about 20 percent by weight based on the salt portion of said salt-hydrate.

9. A method in accordance with claim 6 wherein said nucleating agent is borax.

10. A method in accordance with claim 9 wherein said borax is present at a level from about 5 to about 10 percent by weight based on the weight of the salt portion of said salt hydrate.

* * * * *